US011468398B2

(12) United States Patent
Bai et al.

(10) Patent No.: US 11,468,398 B2
(45) Date of Patent: Oct. 11, 2022

(54) SYSTEM AND METHOD FOR COMPUTER-IMPLEMENTED SPLIT SHIPPING COMMUNICATION PROCESSES

(71) Applicant: COUPANG CORP., Seoul (KR)

(72) Inventors: Lianxi Bai, Seoul (KR); Sang Ho Yim, Seoul (KR); Woong Kim, Kyounggi-do (KR); Yoo Suk Kim, Seoul (KR); Hyunggeun Ji, Seoul (KR); Erik Rehn, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 16/299,619

(22) Filed: Mar. 12, 2019

(65) Prior Publication Data

US 2020/0293991 A1 Sep. 17, 2020

(51) Int. Cl.
*G06Q 10/08* (2012.01)
(52) U.S. Cl.
CPC .................. *G06Q 10/0838* (2013.01)
(58) Field of Classification Search
CPC ............ G06Q 10/0838; G06Q 10/08
See application file for complete search history.

(56) References Cited

U.S. PATENT DOCUMENTS

| 5,509,538 | A  | * | 4/1996  | Spindler | B65G 1/1376 198/370.01 |
| 7,984,809 | B1 | * | 7/2011  | Ramey    | B07C 7/02 209/546 |
| 8,086,344 | B1 | * | 12/2011 | Mishra   | G06Q 10/087 700/214 |
| 8,504,413 | B1 |   | 8/2013  | Rowe et al. | |

(Continued)

FOREIGN PATENT DOCUMENTS

JP 10-297722 A 11/1998
JP JP 2010-529536 A 8/2010
(Continued)

OTHER PUBLICATIONS

Oracle Order Management Suite. (n.d.). (created Aug. 2002). Retrieved May 25, 2022, from https://docs.oracle.com/cd/A99488_03/acrobat/115omapi.pdf (Year: 2002).*
International Search Report and Written Opinion for International Application No. PCT/IB2020/052161 dated Jun. 30, 2020 (11 pages).
Notice of Preliminary Rejection in corresponding Korean Patent Application No. 10-2019-0057671 dated Feb. 21, 2021 (15 pages).

(Continued)

*Primary Examiner* — Rupangini Singh
*Assistant Examiner* — Manal A. Alsamiri
(74) *Attorney, Agent, or Firm* — Finnegan, Henderson, Farabow, Garrett & Dunner LLP

(57) ABSTRACT

The disclosed embodiments provide computer-implemented systems and methods for time-based split shipping partially delayed orders. The system may include a network interface connecting two separate devices, one or more memory devices storing instructions, and one or more processors configured to execute the instructions to display, via a first user interface for a first display, a representation of one or more cells in a sorting apparatus. Additionally, the system may send an indication to a second user interface for the second display instructing which of the one or more cells in the sorting apparatus to add items from an order to, determine that the order is occupying the one or more cells in the sorting apparatus for a predetermined amount of time.

20 Claims, 9 Drawing Sheets

(56) References Cited

U.S. PATENT DOCUMENTS

| | | | | |
|---|---|---|---|---|
| 8,560,461 | B1* | 10/2013 | Tian | G06Q 10/087 |
| | | | | 705/332 |
| 9,248,965 | B1* | 2/2016 | Kritchevsky | G11B 17/225 |
| 2003/0046173 | A1* | 3/2003 | Benjier | G06Q 30/0641 |
| | | | | 705/26.8 |
| 2009/0223877 | A1* | 9/2009 | Karnin | B07C 3/00 |
| | | | | 209/552 |
| 2015/0324736 | A1 | 11/2015 | Sheets et al. | |
| 2017/0221162 | A1* | 8/2017 | Colodny | G06Q 30/016 |
| 2017/0320102 | A1* | 11/2017 | McVaugh | B07C 7/02 |
| 2019/0012634 | A1 | 1/2019 | Qin et al. | |
| 2019/0122245 | A1* | 4/2019 | Sahay | G06Q 30/0222 |

FOREIGN PATENT DOCUMENTS

| | | |
|---|---|---|
| KR | 10-2009-0055096 A | 2/2009 |
| TW | 201905778 A | 2/2019 |
| WO | WO 2018/068024 A1 | 4/2018 |
| WO | WO 2019-041000 A1 | 3/2019 |

OTHER PUBLICATIONS

Rejection Decision in corresponding Taiwanese Patent Application No. 10910805 dated Apr. 19, 2021 and English Translation—9 pages.

Taiwanese Office Action in corresponding Taiwanese Patent Application No. 10910805 and Search Report dated Jan. 6, 2021 and English Translation—50 pages.

Australian Examination Report in Australian Application No. 2020235571, dated Nov. 13, 2020 (6 pages).

Hong Kong Examination Notice received in Hong Kong Application No. 22020004079.2, dated May 31, 2021 (8 pages).

Japanese Office Action in Japanese Patent Application No. 2020-537716, dated Jun. 15, 2021, (9 pages).

https://detail.chiebukuro.yahoo.co.jp/qa/question_detail/q101113280980 Sep. 11, 2013 (6 pages).

Indian Office Action in counterpart Indian Application No. 202047049595 dated Dec. 8, 2021 (6 pages).

Office Action in counterpart Taiwanese Application No. 10910805 dated Jun. 20, 2022 (4 pages).

* cited by examiner

SYSTEM AND METHOD FOR COMPUTER-IMPLEMENTED SPLIT SHIPPING COMMUNICATION PROCESSES

TECHNICAL FIELD

The present disclosure generally relates to computerized systems and methods for time-based split shipping partially delayed orders. In particular, embodiments of the present disclosure relate to inventive and unconventional systems which may provide a notification system for delayed cell, an interface with a representation of delayed cells, a determination to split an order associated with the delayed cells, and an interface instructing which cells to complete for shipping.

BACKGROUND

Electronic systems for communications enabling shipping, transportation, and logistics operations delay order shipment until all items of an entire order are fulfilled. Such delay in order shipment causes additional interruptions in the shipment process in many respects. First, delaying an order shipment until an entire order is fulfilled causes delays in the processing of orders. Second, part of the order uses space in cells of sorting apparatuses (such as rebin walls) and processing power that may be used for other orders, ultimately wasting resources. Furthermore, such delay causes problems with electronic systems that allocate batches to sorting apparatuses because they depend on the sorting apparatuses being empty enough to contain at least some part of the batch. Moreover, if sorting apparatuses are all busy because orders are delayed, those sorting apparatuses get backed up and slow down the entire process. Furthermore, current electronic systems fail to analyze the amount of time part of an order has been delayed and fail to make a determination to split the order based on timing and other logical constraints.

In view of the shortcomings of current electronic systems and methods for shipping orders, a system for enhancing the shipping, transportation, and logistics operation of shipping orders by split shipping—separating one order with a delayed item and a ready item into two orders shipped at different times, for example—is desired. More specifically, a computer-implemented system for time-based split shipping partially delayed orders is desired. Therefore, there is a need for improved electronic methods and systems for split shipping partially delayed orders.

SUMMARY

One aspect of the present disclosure is directed to a computer-implemented system for time-based split shipping partially delayed orders. For example, certain embodiments may include a network interface connecting two separate devices, one or more memory devices storing instructions, and one or more processors configured to execute the instructions. In some embodiments, the one or more processors are configured to execute the instructions to display, via a first user interface for a first display, a representation of one or more cells in a sorting apparatus and send an indication to a second user interface for a second display instructing which of the one or more cells in the sorting apparatus to add items from an order to. Additionally, the one or more processors are configured to execute the instructions to determine that the order is occupying the one or more cells in the sorting apparatus for a predetermined amount of time and in response to an affirmative determination that the order is occupying the one or more cells in the sorting apparatus for the predetermined amount of time, modify an appearance of the one or more cells associated with the order and provide an alert via the first user interface for the first display. Moreover, the one or more processors are configured to execute the instructions to send an indication to split the order, receive an indication to split the order, and send an indication to the second user interface for the second display to complete the one or more cells associated with the order for split shipping and create a new order with remaining items from the order to be allocated to at least one of a new cell in the sorting apparatus or another sorting apparatus.

Another aspect of the present disclosure is directed to a computer-implemented method for time-based split shipping partially delayed orders. For example, certain embodiments of the method may include displaying, via a first user interface for a first display, a representation of one or more cells in a sorting apparatus and sending an indication to a second user interface for a second display instructing which of the one or more cells in the sorting apparatus to add items from an order to. In some embodiments, the method may include determining that the order is occupying the one or more cells in the sorting apparatus for a predetermined amount of time and in response to an affirmative determination that the order is occupying the one or more cells in the sorting apparatus for the predetermined amount of time, modifying an appearance of the one or more cells associated with the order and providing an alert via the first user interface for the first display. Additionally, the method may include sending an indication to split the order and receiving an indication to split the order, and sending an indication to the second user interface for the second display to complete the one or more cells associated with the order for split shipping and creating a new order with remaining items from the order to be allocated to at least one of a new cell in the sorting apparatus or another sorting apparatus.

Yet another aspect of the present disclosure is directed to a computer-implemented system for split shipping partially delayed orders. For example, certain embodiments may include a network interface connecting two separate devices, one or more memory devices storing instructions, and one or more processors configured to execute the instructions to display, via a first user interface for a first display, a representation of one or more cells in a sorting apparatus. Additionally, the one or more processors are configured to execute the instructions to send an indication to a second user interface for a second display instructing which of the one or more cells in the sorting apparatus to add items from an order to and modify an appearance of the one or more cells associated with the order and provide an alert via the first user interface for the first display. Moreover, the one or more processors are configured to execute instructions to send an indication to split the order, receive an indication to split the order, and send an indication to the second user interface for the second display to complete the one or more cells associated with the order for split shipping and create a new order with remaining items from the order to be allocated to at least one of a new cell in the sorting apparatus or another sorting apparatus.

Other systems, methods, and computer-readable media are also discussed herein.

DETAILED DESCRIPTION

Figure 1A:
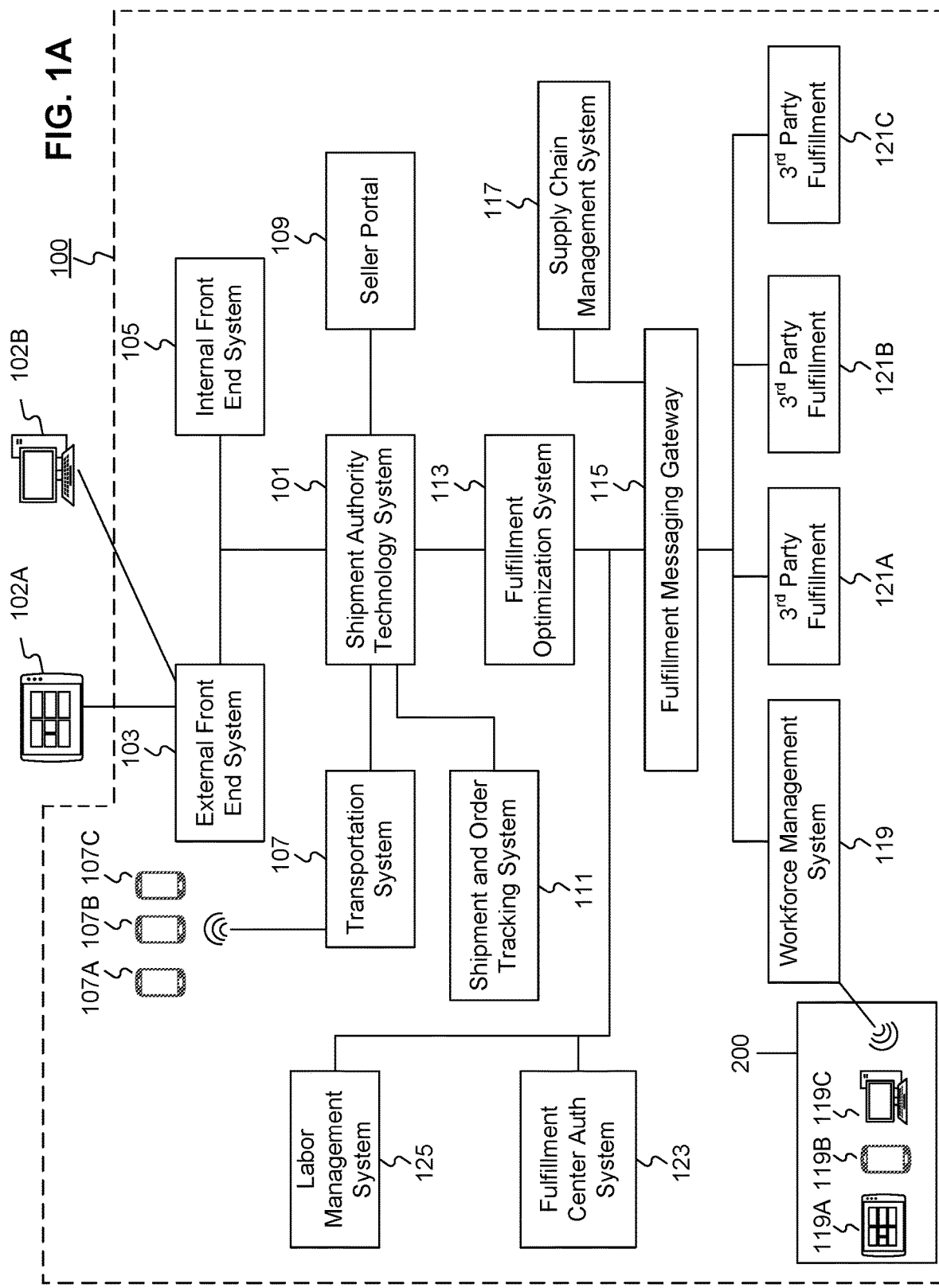
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for time-based split shipping partially delayed orders. For example, certain embodiments may include a network interface connecting two separate devices, one or more memory devices storing instructions, and one or more processors configured to execute the instructions. In some embodiments, the one or more processors are configured to execute the instructions to display, via a first user interface for a first display, a representation of one or more cells in a sorting apparatus and send an indication to a second user interface for a second display instructing which of the one or more cells in the sorting apparatus to add items from an order to. Additionally, the one or more processors are configured to execute the instructions to determine that the order is occupying the one or more cells in the sorting apparatus for a predetermined amount of time and in response to an affirmative determination that the order is occupying the one or more cells in the sorting apparatus for the predetermined amount of time, modify an appearance of the one or more cells associated with the order and provide an alert via the first user interface for the first display. Moreover, the one or more processors are configured to execute the instructions to send an indication to split the order, receive an indication to split the order, and send an indication to the second user interface for the second display to complete the one or more cells associated with the order for split shipping and create a new order with remaining items from the order to be allocated to at least one of a new cell in the sorting apparatus or another sorting apparatus Referring to FIG. 1A, a schematic block diagram illustrating an exemplary embodiment of a system 100 comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
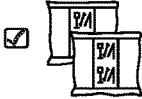
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, sorting apparatus work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
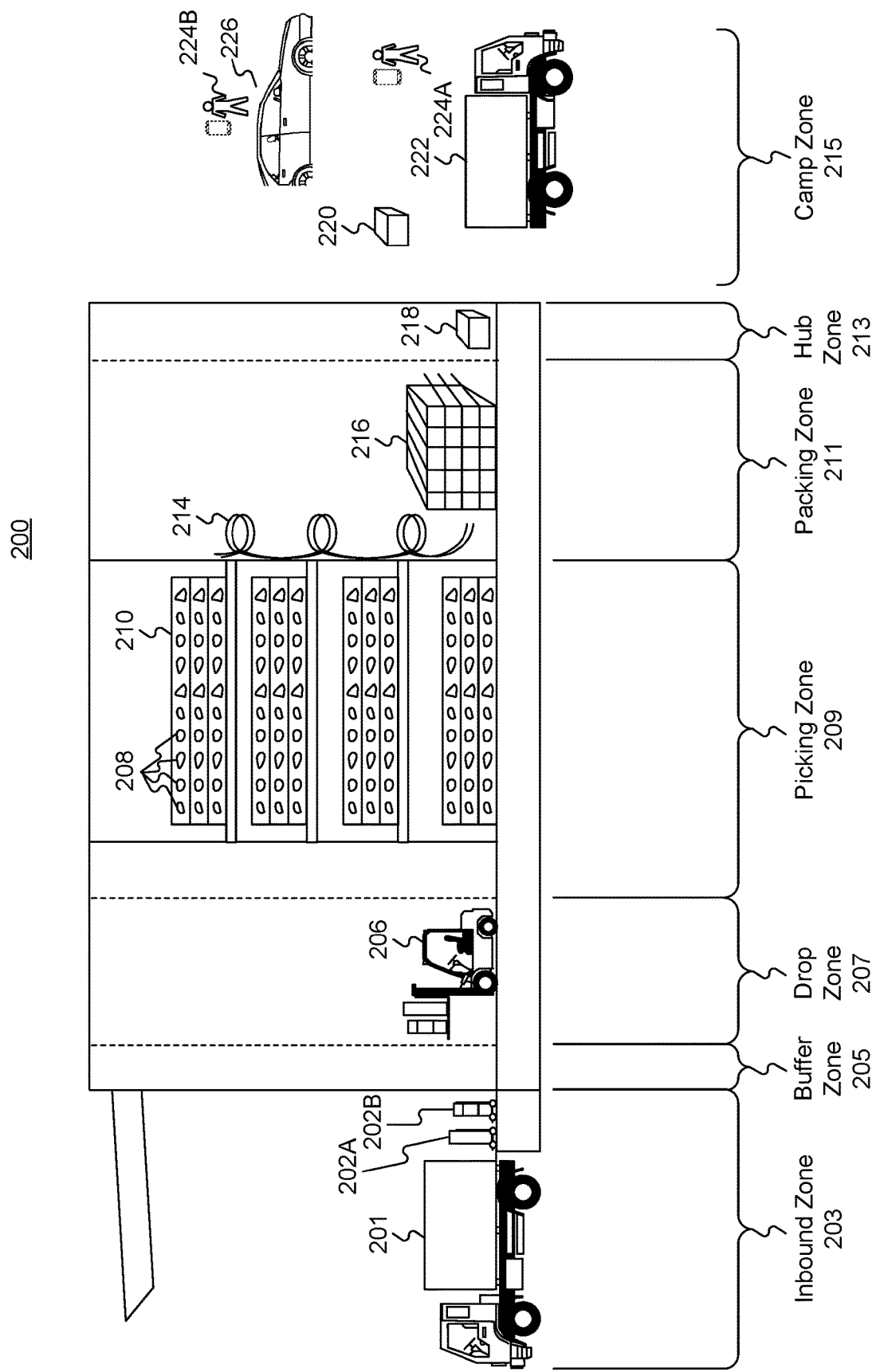
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1198.

Once a user places an order, a picker may receive an instruction on device 1198 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
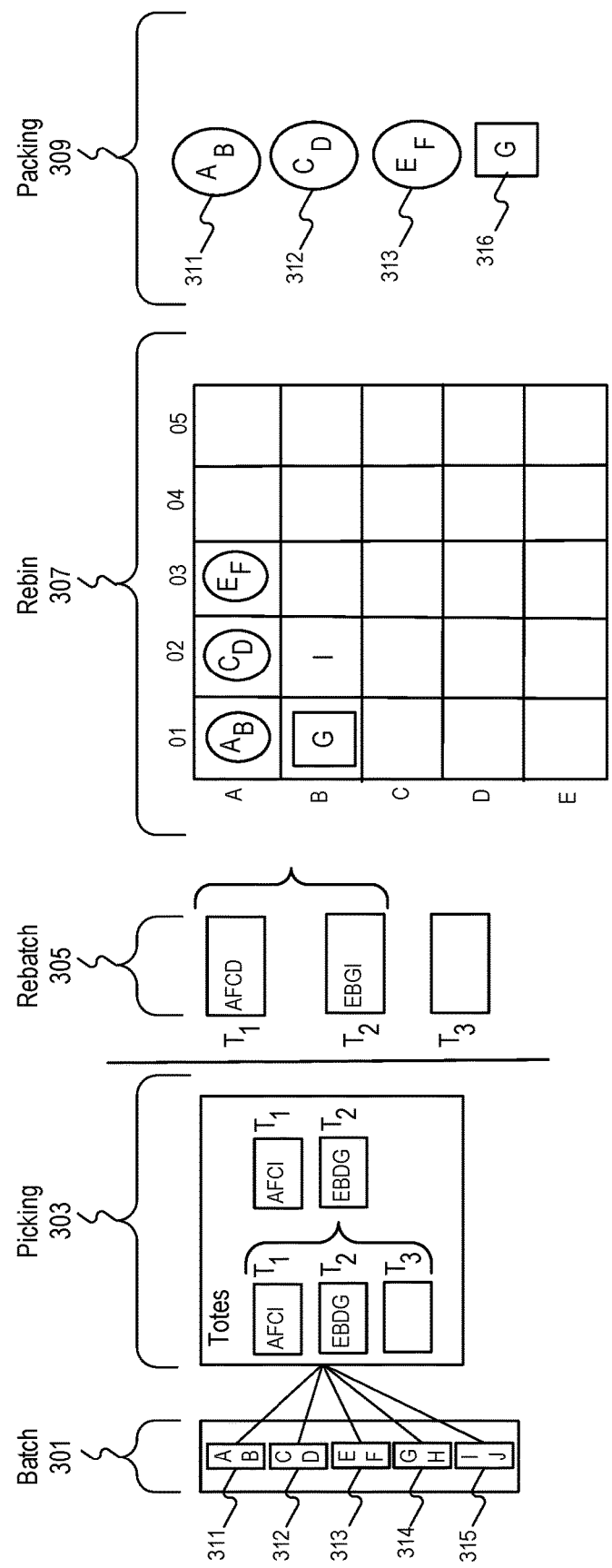
FIG. 3 is a diagrammatic illustration of an exemplary process including picking, rebatch, rebin, and packing, consistent with the disclosed embodiments.

FIG. 3 is a diagrammatic illustration of an exemplary process including picking, rebatch, rebin, and packing processes, consistent with the disclosed embodiments. In some embodiments, "picking" entails selecting items from individual orders of a batch and placing them into totes. In some embodiments "rebatch" entails collecting all the totes for one batch and reorganizing the totes by recombining the totes to have items from one order in the same tote. In some embodiments, "rebin" entails categorizing the totes into the shipment. In some embodiments, "packing" entails preparing and boxing up the rebinned orders for shipment. Each of these processes may be performed by a machine (e.g., a robot or other device with appropriate apparatuses, including scanning devices and machinery to move totes or items) or a human worker, or some combination (e.g., using machine-assisted labor).

Process 300 of FIG. 3 depicts exemplary batch 301. Batch 301 includes five orders. Each of the five orders of batch 301 include two items in the order represented by Stock Keeping Units (SKUs). In some embodiments, items of each order may have been placed by users at devices mobile device 102A or computer 102B of FIG. 1A through a website hosted on external front end system 103 of FIG. 1A. For example, as depicted in FIG. 3, order 311 includes SKUs A and B, order 312 includes SKUs C and D, order 313 includes SKUs E and F, order 314 includes SKUs G and H, and order 315 includes SKUs I and J. In some embodiments, automated scanning equipment (e.g., associated with computer 119C) may scan a barcode associated with the SKUs for storing information regarding the order parts for the picking, rebatch, rebin, and packing processes. In yet other embodiments, the SKUs allow a worker (as described above in FIG. 2) to read the order parts for the picking, rebatch, rebin, and packing processes.

FIG. 3 further depicts a picking process 303. In some embodiments, picking 303 takes place in picking zone 209 of FIG. 2, where a picker—workers or machines—picks items from individual orders of batch 301 and places them into totes. In some embodiments, the items from batch 301 may be moved to the picking process depicted as shown in picking 303. The picker may pick ten SKUs from A to J. SAT system 101 of FIG. 1A may generate instructions to pick based on the picker's location or other conditions. As depicted in FIG. 3, the picker picked SKUs A, F, C, and I first and positioned SKUs A, F, C, and I in tote 1, T1. FIG. 3 further depicts that the picker picks E, B, D, and G SKUs in tote 2, T2. For example, SKUs A, F, C, and I were picked first and SKUs E, B, D, G were picked second because of their location in the warehouse. SKUs H and J have not yet been picked in process 300 because they are delayed. Tote 3, T3 is empty because the order is not complete or able to be picked. In some embodiments, tote 3, T3 may have been used for SKUs H and J had they not been delayed.

Conventional systems cause the first and second totes to be held and typically delayed until the third tote is scanned by a system, using a scanning device such as tablet 119A, mobile device/PDA 119B, computer 119C, or the like of FIG. 1A in order to proceed to rebatch, rebin, and packing processes. However, as depicted in FIG. 3, picking 303 moves on to rebatch 305 without being delayed by tote 3, T3 or delayed SKUs H and J. In some embodiments, if tote 1, T1 is complete, the system may process this one tote into rebatch, rebin, and packing without waiting on delayed tote 2, T2 and tote 3, T3.

To efficiently pick for orders, SAT system 101 of FIG. 1A may combine multiple orders, e.g., using multiple totes for one batch. In some embodiments, SAT system 101 of FIG. 1A may have multiple batches with work in process simultaneously. As further depicted in FIG. 3, during rebatch process 305, machines in picking zone 209 of FIG. 2 collect all the totes for one batch, e.g., tote 1, T1 and tote 2, T2 and reorganizes them by recombining them into the order level (recombining the totes to have items from one order in the same tote). Once the totes are all collected, the totes proceed to rebin process 307 which entails categorizing the totes into the shipment.

Furthermore, rebin process 307 depicts twenty-five cells in a sorting apparatus. In some embodiments, the sorting apparatus may be a rebin wall, but other embodiments as possible as well. In other embodiments, process 307 may include sorting apparatuses of varying sizes. FIG. 3 depicts cells A01-A05, B01-B05, C01-C05, D01-D05, and E01-E05. Each cell includes one order or one shipment. The sorting apparatus, as shown in FIG. 3, is virtually mapped with the physical sorting apparatus (rebin wall). SAT system 101 of FIG. 1A may generate instructions to move an item to a cell in the sorting apparatus by displaying the item in such a cell on the worker's user device such as tablet 119A, mobile device/PDA 119B, computer 119C, or the like of FIG. 1A. In some embodiments, sorting apparatus may be depicted on a user interface of a worker's display device. Cell A01 of sorting apparatus includes SKUs A and B, cell A02 includes SKUs C and D, cell A03 includes SKUs E and F, cell B01 includes SKU G, and cell B02 includes SKU I. In some embodiments, a worker may start to process tote 1, T1 which includes A, F, C, and D SKUs. For example, the worker may scan the SKUs A, F, C, and D from tote 1, T1 using a scanning device such as tablet 119A, mobile device/PDA 119B, computer 119C, or the like of FIG. 1A. In some embodiments, once a worker scans SKU A, the SAT system 101 of FIG. 1A may generate instructions to place SKU A into cell A01, as shown on the user interface of their display device. Furthermore, when the worker scans SKU F using a scanning device such as tablet 119A, mobile device/PDA 119B, computer 119C, or the like of FIG. 1A, SAT system 101 may generate instructions to place SKU F into cell A03 since it is mapped to the third cell. Furthermore, when the worker scans SKU C, SAT system 101 may generate instructions to place the SKU C into the cell A02 since it is mapped to the second cell. SAT system 101 may further generate instructions to place SKUs B, D, G, and I into their correct cells.

As shown in FIG. 3, cell A01 including SKUs A and B, cell A02 including SKUs C and D, and cell A03 including SKUs E and F are completed orders. Accordingly, SAT system 101 may generate instructions to complete these orders and move them over to packing 309. However, cells B01 and B02 including SKU G and SKU I respectively are not complete orders. In some embodiments, SAT system 101 of FIG. 1A may determine that SKU H is delayed and split ship the order at the shipment level. Accordingly, SAT system 101 may generate instructions to complete the order and move the order over to packing 309. Original order 314 including SKUs G and H is split and ready order 316 with SKU G is moved to packing via forklift, cart, dolly, handtruck, conveyor belt, manually, or otherwise as described above in FIG. 2. The remaining item of order 314, SKU H, will be given a new order number and a different position on the sorting apparatus or another sorting apparatus once it is received. In some embodiments, each order in a batch is given an order number. When a shipment is split into two or more shipments, each new order of the split shipment is provided a new order number. In some embodiments, SAT system 101 of FIG. 1A may determine that SKU J is delayed but may not split the order of SKUs I and J.

To process a lot of orders effectively and efficiently, SAT system 101 of FIG. 1A splits all of those orders to pick quickly, and then through re-batch and re-bin, recombine them into the order level.

As described above, SAT system 101 of FIG. 1A enables split-shipping an order—separating one order with a delayed item and a ready item into two orders shipped at different times, for example. In some embodiments, if an order comprises more than one item, those items may arrive at the sorting apparatus at different times. A worker may be told which cell to add items from a particular order to, based on logic in the computer system. In prior systems, given enough orders, it is possible for the sorting apparatus to fill up with partially-complete orders, which prevents other orders from being stored in the sorting apparatus. In order to solve this problem, SAT system 101 of FIG. 1 may determine that an order is holding up a space in the sorting apparatus for more than a specific amount of time, e.g., 30 minutes. Based on that determination, a user interface (not depicted) at the manager's computer may display an interface representing each cell in the sorting apparatus with various appearances of the cells including different shapes and/or colors, e.g., from green to red, and provide an alert. The manager may then click on the cell to force the order to split. In response to the manager's indication to split the order, SAT system 101 of FIG. 1A sends a message to the worker's computer ordering the worker to complete that cell for split shipping and send the items in the cell to the packing worker (shown in FIG. 4 and discussed below). As a result, a new order may be created with the remaining items from the order, and such a new order may be allocated to a new cell in the sorting apparatus or another sorting apparatus.

In some embodiments, SAT system 101 makes a determination to split an order. In some embodiments, SAT system 101's determination to split an order is based on an order holding up a space in the sorting apparatus for more than a specific amount of time. In other embodiments, SAT system 101's determination to split an order is based on any information on the package such as if the item is a perishable item. In yet other embodiments, SAT system 101's determination to split an order is based on whether the items for that order is being picked or whether the tote has been worked on in the past few minutes. For example, SAT system 101 may determine whether any user or machine has scanned an identifier on the tote by sending a query to WMS 119 for all scan transactions in which the tote's identifier was scanned.

In one example, if a picker has been picking the items for one tote, but had stopped working and went somewhere else (e.g., determined by timing of scans or scanning of items from a different tote), that means the work is not in progress. Accordingly, determination to split an order is based on whether the work is not in progress. In another example, a determination to split an order is based on whether the item has been sent through the conveyer belt or not.

In some embodiments, a worker may trigger such determination to split an order (problem reporting button). In such an embodiment, if the worker clicks on the problem reporting button, the shipment may be split. Furthermore, SAT system 101 may trigger a determination to split an order.

As described above, each customer order has a deadline date for delivery (promised delivery date or PDD). Based on the promised delivery date, there is a standard as to shipment date. In one example, on the date of the shipment date deadline, one of the two items in an order has been picked and rebinned but the other item has not arrived. In such a situation, a manager may click on the problem reporting button or SAT system 101 may make a determination to split ship so that part of the order can be fulfilled or shipped out first, without waiting for the other item, although those two items are in one order. In other embodiments, the system may determine that today is the shipment date deadline and the second item has not been picked. In such an embodiment, the system may split the order and send a notification to the worker to mark the first item in the order as complete. In some embodiments, a shipment with multiple items may be split multiple times. In some embodiments, the system may set a cap on the number of splits that may be made.

Figure 4:
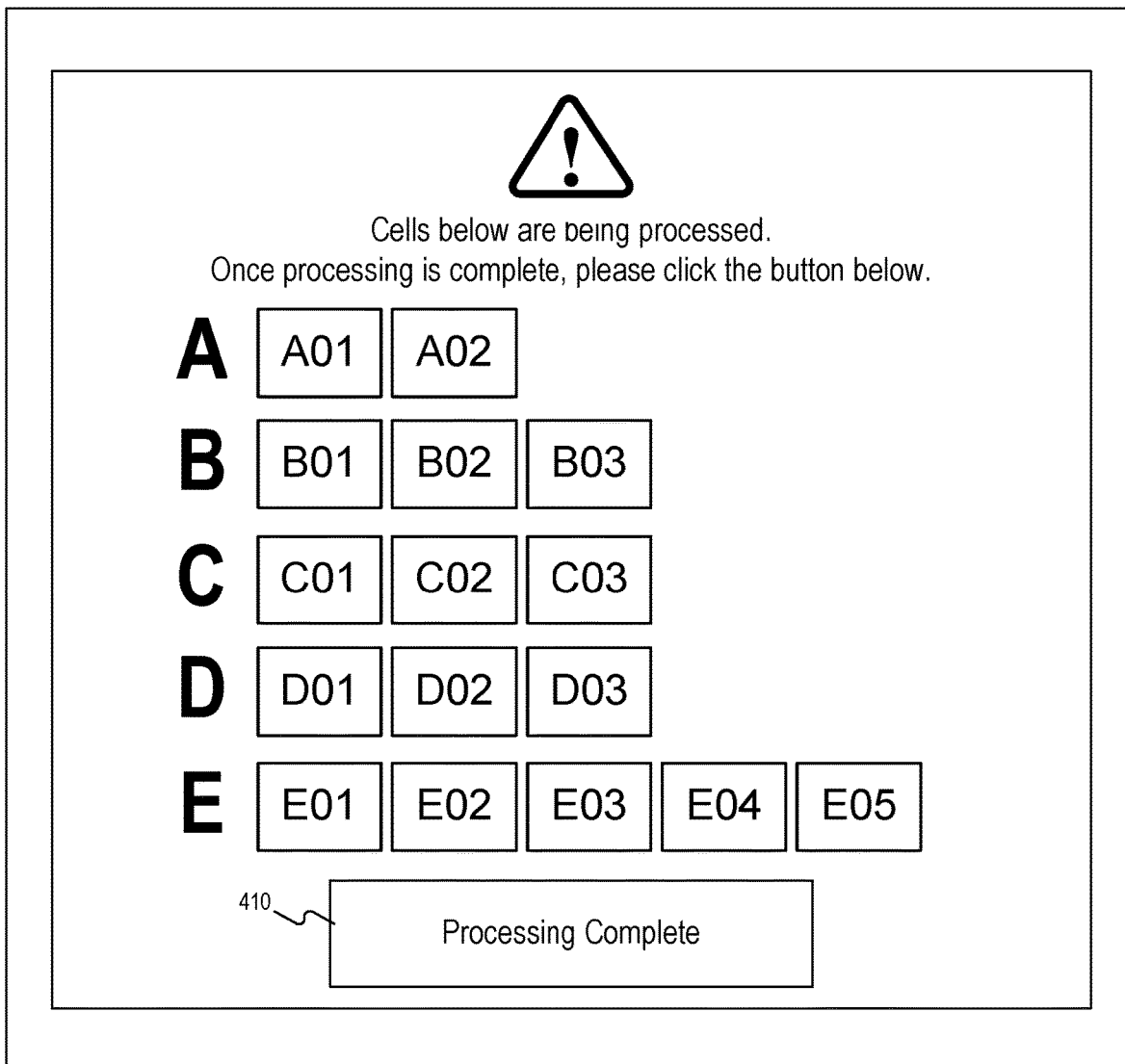
FIG. 4 depicts a sample message appearing on a worker's user interface, consistent with the disclosed embodiments.

FIG. 4 depicts a sample message appearing on a worker's user interface, consistent with the disclosed embodiments. Display 400 (corresponding to tablet 119A, mobile device/PDA 119B, computer 119C of FIG. 1A) includes a user interface presented to workers. Display 400 notifies the workers that cells A01, A02, B01, B02, B03, C01, C02, CO3, D01, D02, D03, E01, E02, E03, E04, and E05 presented on the screen are being processed. Display 400 receives instructions, generated by SAT system 101, to display a "Processing Complete" button for clicking once the processing of the depicted cells is complete. In some embodiments, display 400 may display which cells the worker should complete. In some embodiments, display 400 may be in proximity to and/or associated with sorting apparatus 216 (e.g., WMS 119 may store an association between the user using the computer and the sorting apparatus).

In some embodiments, cells on a manager's user interface (not depicted) may change appearance in order to provide notification of delayed cells and provide an option to split ship the orders in the delayed cells. For example, in some embodiments, a cell may change color once a worker works on or has not worked on an order for a pre-determined amount of time. In some embodiments, a cell may change shape once a worker works or has not worked on an order for a pre-determined amount of time. In some embodiments, a cell may change in position once a worker works or has not worked on an order for a pre-determined amount of time. In some embodiments, the threshold of the pre-determined amount of time is 30 minutes. For example, if a worker does not work on a particular order for 30 minutes, then SAT system 101 of FIG. 1A may indicate a notification to split ship the order and the cell holding the order would change color on the user interface. In some embodiments, a manager's user interface (not depicted) may display overdue cells.

In some embodiments, white may depict a work in progress, green may depict that rebin is complete, grey may depict cancelation, and red may depict the orders that haven't been complete for a pre-determined amount of time. Thus, if a number of orders are not complete for a pre-determined amount of time, the system may change the color of their associated cells to be red on the user interface. In such an embodiment, the manager may decide to click on the problem reporting button to split ship the order. In other embodiments, if a cell is colored red for a pre-determined amount of time based on the order not having been complete for a long time, the system may split the shipment without the manager clicking the problem reporting button.

In embodiments where the manager clicks on the problem reporting button, display 400 may adapt to show the worker that those cells have been complete and display instructions to send the order in that cell to packing. In an embodiment where a shipment is split, display 400 may adapt to show the worker that those cells have been complete and display instructions to send the order in that cell to packing.

Figure 5:
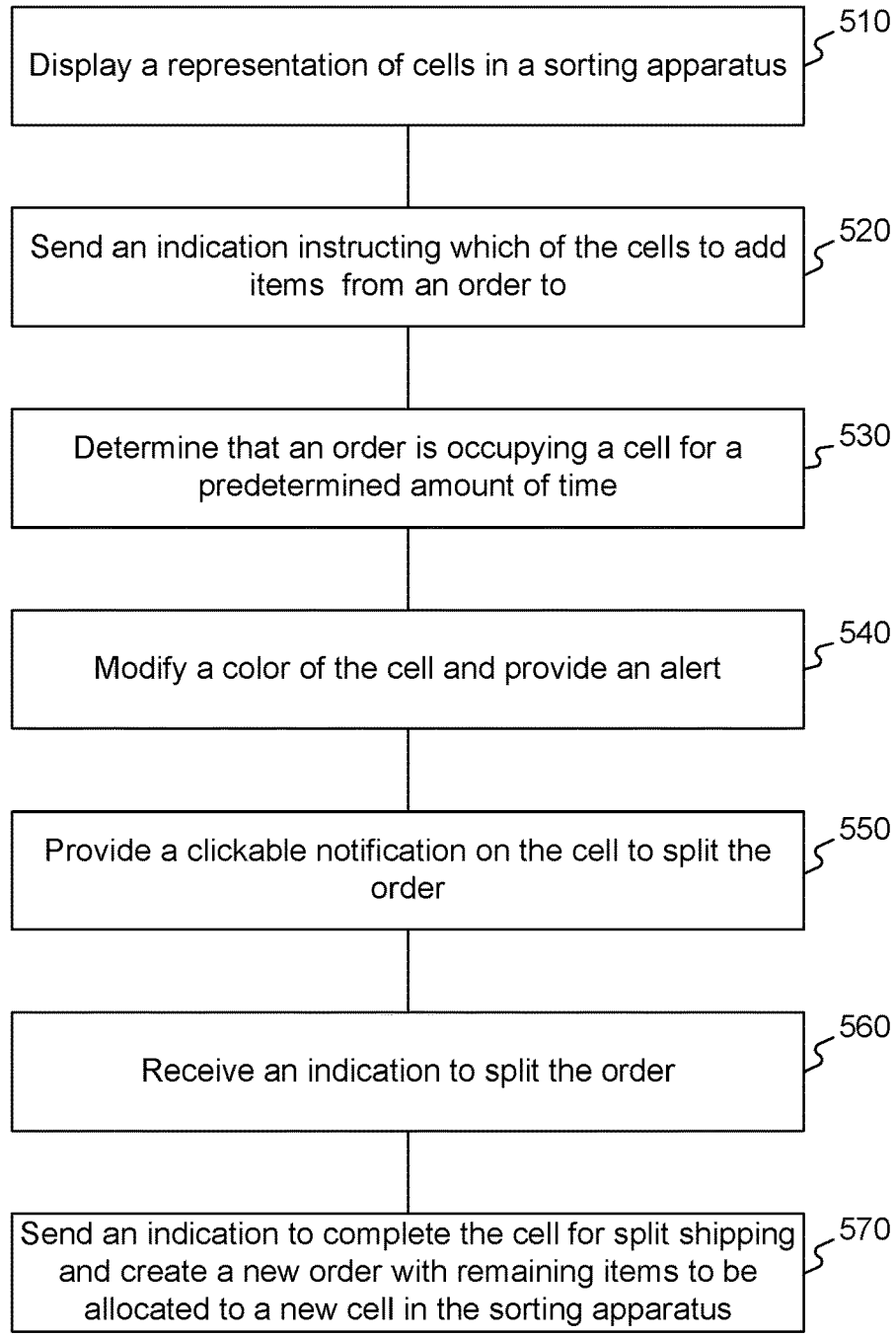
FIG. 5 is a block diagram of an exemplary process for time-based split shipping partially delayed orders, consistent with disclosed embodiments.

FIG. 5 is a block diagram of an exemplary process for time-based split shipping partially delayed orders, consistent with disclosed embodiments. Process 500 may be performed by processor of, for example, WMS 119, which executes instructions encoded on a computer-readable medium storage device. It is to be understood, however, that one or more steps of process 500 may be implemented by other components of system 100 (shown or not shown).

At step 510, system 100 may display, via a first user interface, a representation of one or more cells in a sorting apparatus. The first user interface displays indications regarding delay time of orders. In response, the manager can elect to split ship an order, and then the instruction gets sent to the worker device (e.g., 119C connected to WMS 119). The first user interface at the manager's computer may display an interface representing each cell in the sorting apparatus with various colors of the cells, e.g., green, grey, red, or white, and provide an alert to indicate the detection of cells that should be split shipped. The manager may then click on the cell to force the order to split. In response to the manager's indication to split the order, SAT system 101 of FIG. 1A sends a message to the worker's computer ordering the worker to complete that cell for split shipping and send the items in the cell to the packing worker (shown in FIG. 4 and discussed above). As a result, a new order may be created with the remaining items from the order, and such a new order may be allocated to a new cell in the sorting apparatus or another sorting apparatus.

At step 520, SAT system 101 may send an indication to a second user interface (e.g., at computer 119C) instructing which of the one or more cells in the sorting apparatus to add items from an order to.

At step 530, SAT system 101 may determine that the order is occupying the one or more cells in the sorting apparatus for a predetermined amount of time. For example, SAT system 101 may begin a software or hardware timer based on when an order is first assigned to a cell at a sorting apparatus, and may determine that the timer has reached a predetermined amount of time (e.g., 30 minutes).

At step 540, SAT system 101 may, in response to an affirmative determination that the order is occupying the one or more cells in the sorting apparatus for the predetermined amount of time, SAT system 101 of FIG. 1 may modify a color of the one or more cells associated with the order and provide an alert via the first user interface to indicate the delayed status of an order.

In some embodiments, cells on a manager's user interface may change color in order to provide notification of delayed cells and provide an alert to indicate the delayed status of an order. In some embodiments, a cell may change color once a worker works on or has not worked on an order for a pre-determined amount of time. In some embodiments, the threshold of the pre-determined amount of time is 30 minutes. For example, if a worker does not work on a particular order for 30 minutes, then SAT system 101 of FIG. 1A may indicate a notification to split ship the order and the cell holding the order would change color on the user interface. In some embodiments, a manager's user interface (not depicted) may display overdue cells.

In some embodiments, white may depict a work in progress, green may depict that rebin is complete, grey may depict cancelation, and red may depict the orders that haven't been complete for a pre-determined amount of time. Thus, if a number of orders are not complete for a pre-determined amount of time, the system may change the color of their associated cells to be red on the user interface. In such an embodiment, the manager may decide to click on the problem reporting button to split ship the order. In other embodiments, if a cell is colored red for a pre-determined amount of time based on the order not having been complete for a long time, the system may split the shipment without the manager clicking the problem reporting button.

At step 550, SAT system 101 may send a notification to a first user interface (e.g., a manager's user interface). The indication may be programmed to cause SAT system 101 to split the order.

At step 560, SAT system 101 may receive an indication to split the order. In such an embodiment, a manager may have clicked a notification associated with the one or more cells associated with the order at step 550. In other embodiments, the SAT system 101 may have determined to split the order based on a pre-determined amount of time after sending the indication of step 550.

At step 570, SAT system 101 may send an indication to the second user interface to complete the one or more cells associated with the order for split shipping and create a new order with remaining items from the order to be allocated to at least one of a new cell in the sorting apparatus or another sorting apparatus. In response to the indication to split the order, SAT system 101 of FIG. 1A may send a message to the worker's computer (e.g., computer 119C) ordering the worker to complete that cell for split shipping and send the items in the cell to the packing worker (shown in FIG. 4 and discussed above). As a result, SAT system 101 may also create a new order with the remaining items from the order, and such a new order may be allocated to a new cell in the sorting apparatus or another sorting apparatus.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for time-based split shipping partially delayed orders, the system comprising:
    a network interface connected to two separate devices;
    one or more memory devices storing instructions; and
    one or more processors configured to execute the instructions to:
        display, via a first user interface for a first display, a representation of one or more cells in a sorting apparatus, wherein the first user interface is associated with a management device configured to manage one or more orders for a plurality of customers;
        send a first indication to a second user interface for a second display instructing which of the one or more cells in the sorting apparatus to add items from an order to;
        determine that the order is occupying the one or more cells in the sorting apparatus for a predetermined amount of time;
        in response to the determination that the order is occupying the one or more cells in the sorting apparatus for the predetermined amount of time, modify one of shape or color of the one or more cells in the representation of one or more cells associated with the order and provide an alert via the first user interface for the first display, wherein the alert includes a clickable notification allowing a user of the management device to determine whether to split the order;
        receive, responsive to sending the clickable notification, a second indication from the management device to split the order;
        send a third indication to the second user interface for the second display to complete the one or more cells associated with the order for split shipping and create a new order with remaining items from the order to be allocated to at least one of a new cell in the sorting apparatus or another sorting apparatus; and
        provide instructions to a machine to move the items from the one or more cells associated with the order to an area for packing.

2. The system of claim 1, wherein the first user interface for the first display and the second user interface for the second display are displayed on one of a smart phone, a tablet, a laptop, or other computer device.

3. The system of claim 1, wherein the first user interface for the first display is configured to be depicted on a manager computer associated with the user.

4. The system of claim 1, wherein the second user interface for the second display is depicted on a user device associated with a worker.

5. The system of claim 1, further comprising a timer for determining an amount of time that the order is occupying the one or more cells in the sorting apparatus after assigning the order to the one or more cells.

6. The system of claim 1, wherein the predetermined amount of time is thirty minutes.

7. The system of claim 1, wherein the one or more processors are further configured to execute the instructions to:
    determine that the new order is occupying the one or more cells in the sorting apparatus for the predetermined amount of time;
    in response to an affirmative determination that the new order is occupying the one or more cells in the sorting apparatus for the predetermined amount of time, modify an appearance of the one or more cells associated with the new order and provide an alert via the first user interface for the first display;
    send a fourth notification to split the new order; and
    send a fifth indication to the second user interface for the second display to complete the one or more cells associated with the new order for split shipping and create a second new order with remaining items from the new order to be allocated to at least one of a second new cell in the sorting apparatus or another sorting apparatus.

8. A computer-implemented method for time-based split shipping partially delayed orders, the method comprising:
    displaying, via a first user interface for a first display, a representation of one or more cells in a sorting apparatus, wherein the first user interface is associated with a management device configured to manage one or more orders for a plurality of customers;
    sending a first indication to a second user interface for a second display instructing which of the one or more cells in the sorting apparatus to add items from an order to;
    determining that the order is occupying the one or more cells in the sorting apparatus for a predetermined amount of time;
    in response to the determination that the order is occupying the one or more cells in the sorting apparatus for the predetermined amount of time, modifying one of shape or color of the one or more cells in the representation of one or more cells associated with the order and providing an alert via the first user interface for the first display, wherein the alert includes a clickable notification allowing a user of the management device to determine whether to split the order;
    receiving, responsive to sending the clickable notification, a second indication from the management device to split the order;
    sending a third indication to the second user interface for the second display to complete the one or more cells associated with the order for split shipping and creating a new order with remaining items from the order to be allocated to at least one of a new cell in the sorting apparatus or another sorting apparatus; and
    providing instructions to a machine to move the items from the one or more cells associated with the order to an area for packing.

9. The method of claim 8, wherein the first user interface for the first display and the second user interface for the second display are displayed on one of a smart phone, a tablet, or other computer device.

10. The method of claim 8, wherein the first user interface for the first display is configured to be depicted on a manager computer associated with the user.

11. The method of claim 8, wherein the second user interface for the second display is depicted on a user device associated with a worker.

12. The method of claim 8, further comprising determining an amount of time that the order is occupying the one or more cells in the sorting apparatus, via a timer, after assigning the order to the one or more cells.

13. The method of claim 8, wherein the predetermined amount of time is thirty minutes.

14. The method of claim 8, further comprising:
determining that the new order is occupying the one or more cells in the sorting apparatus for the predetermined amount of time;
in response to an affirmative determination that the new order is occupying the one or more cells in the sorting apparatus for the predetermined amount of time, modifying an appearance of the one or more cells associated with the new order and provide an alert via the first user interface for the first display;
sending a fourth notification to split the new order; and
sending a fifth indication to the second user interface for the second display to complete the one or more cells associated with the new order for split shipping and create a second new order with remaining items from the new order to be allocated to at least one of a second new cell in the sorting apparatus or another sorting apparatus.

15. A computer-implemented system for split shipping partially delayed orders, the system comprising:
a network interface connecting two separate devices; one or more memory devices storing instructions; and
one or more processors configured to execute the instructions to:
display, via a first user interface for a first display, a representation of one or more cells in a sorting apparatus, wherein the first user interface is associated with a management device configured to manage one or more orders for a plurality of customers;
send a first indication to a second user interface for a second display instructing which of the one or more cells in the sorting apparatus to add items from an order to;
modify one of shape or color of the one or more cells in the representation of one or more cells associated with the order and provide an alert via the first user interface for the first display, wherein the alert includes a clickable notification allowing a user of the management device to determine whether to split the order;
receive, responsive to sending the clickable notification, a second indication from the management device to split the order;
send a third indication to the second user interface for the second display to complete the one or more cells associated with the order for split shipping and create a new order with remaining items from the order to be allocated to at least one of a new cell in the sorting apparatus or another sorting apparatus; and
provide instructions to a machine to move the items from the one or more cells associated with the order to an area for packing.

16. The system of claim 15, wherein the first user interface for the first display and the second user interface for the second display are displayed on one of a smart phone, a tablet, a laptop, or other computer device.

17. The system of claim 15, wherein the first user interface for the first display is configured to be depicted on a manager computer associated with the user.

18. The system of claim 15, wherein the second user interface for the second display is depicted on a user device associated with a worker.

19. The system of claim 15, further comprising a timer for determining an amount of time that the order is occupying the one or more cells in the sorting apparatus after assigning the order to the one or more cells.

20. The system of claim 15, wherein the one or more processors are further configured to execute the instructions to:
determine that the new order is occupying the one or more cells in the sorting apparatus for the predetermined amount of time;
in response to an affirmative determination that the new order is occupying the one or more cells in the sorting apparatus for the predetermined amount of time, modify an appearance of the one or more cells associated with the new order and provide an alert via the first user interface for the first display;
send, via the first user interface for the first display, a fourth notification on the one or more cells associated with the new order to split the new order; and
send a fifth indication to the second user interface for the second display to complete the one or more cells associated with the new order for split shipping and create a second new order with remaining items from the new order to be allocated to at least one of a second new cell in the sorting apparatus or another sorting apparatus.

* * * * *